United States Patent
Briglia et al.

(10) Patent No.: US 10,197,328 B2
(45) Date of Patent: Feb. 5, 2019

(54) METHOD AND APPARATUS FOR PURIFYING A CARBON DIOXIDE-RICH MIXTURE AT A LOW TEMPERATURE

(71) Applicant: L'Air Liquide, Societe Anonyme pour l'Etude et l'Exploitation des Procedes Georges Claude, Paris (FR)

(72) Inventors: Alain Briglia, Hangzhou (CN); Arthur Darde, Paris (FR)

(73) Assignee: L'Air Liquide Societe Anonyme Pour L'Etude Et L'Exploirtation Des Procedes Georges Claude, Paris (FR)

( * ) Notice: Subject to any disclaimer, the term of this patent is extended or adjusted under 35 U.S.C. 154(b) by 992 days.

(21) Appl. No.: 14/413,624

(22) PCT Filed: Jul. 10, 2013

(86) PCT No.: PCT/FR2013/051649
§ 371 (c)(1),
(2) Date: May 20, 2015

(87) PCT Pub. No.: WO2014/009658
PCT Pub. Date: Jan. 16, 2014

(65) Prior Publication Data
US 2015/0253076 A1   Sep. 10, 2015

(30) Foreign Application Priority Data
Jul. 13, 2012 (FR) ..................................... 12 56778

(51) Int. Cl.
*F25J 3/02* (2006.01)
*F25J 3/06* (2006.01)
(Continued)

(52) U.S. Cl.
CPC ................ *F25J 3/067* (2013.01); *B01D 3/14* (2013.01); *F25J 3/0223* (2013.01); *F25J 3/0266* (2013.01);
(Continued)

(58) Field of Classification Search
CPC ........ F25J 3/0266; F25J 3/067; F25J 2215/80; Y02C 10/12
See application file for complete search history.

(56) References Cited

U.S. PATENT DOCUMENTS 3,614,872 A    10/1971   Tassoney et al.
4,417,449 A *  11/1983   Hegarty ................. C10G 1/002
                                                          62/622
(Continued)

FOREIGN PATENT DOCUMENTS

FR    2 967 485        5/2012
FR    2971044 A1 *     8/2012  ............. F25J 3/0266
(Continued)

OTHER PUBLICATIONS

FR2971044 machine translation.*
International Search Report and Written Opinion for PCT/FR2013/051649 dated Sep. 30, 2015.

*Primary Examiner* — John F Pettitt
(74) *Attorney, Agent, or Firm* — Justin K. Murray

(57) ABSTRACT

A carbon dioxide-rich mixture is cooled in a first brazed aluminum plate-fin heat exchanger, at least one fluid derived from the cooled mixture is sent to a purification step having a distillation step and/or at least two successive partial condensation steps, the purification step produces a carbon dioxide-depleted gas which heats up again in the first exchanger, the purification step produces a carbon-dioxide rich liquid which is expanded, then sent to a second heat exchanger where it is heated by means of a fluid of the method, the exchanger carrying out an indirect heat
(Continued)

exchange only between the carbon dioxide-rich liquid and the fluid of the method, the carbon dioxide-rich liquid at least partially vaporizes in the second exchanger and the vaporized gas formed heats up again in the first exchanger to form a carbon dioxide-rich gas which can be the end product of the method.

5 Claims, 4 Drawing Sheets

(51) Int. Cl.
*B01D 3/14* (2006.01)
*F25J 5/00* (2006.01)

(52) U.S. Cl.
CPC .............. *F25J 3/0625* (2013.01); *F25J 5/002* (2013.01); *F25J 5/005* (2013.01); *F25J 2200/02* (2013.01); *F25J 2200/70* (2013.01); *F25J 2205/04* (2013.01); *F25J 2205/66* (2013.01); *F25J 2210/04* (2013.01); *F25J 2210/70* (2013.01); *F25J 2220/82* (2013.01); *F25J 2220/84* (2013.01); *F25J 2230/04* (2013.01); *F25J 2230/30* (2013.01); *F25J 2230/32* (2013.01); *F25J 2235/80* (2013.01); *F25J 2245/02* (2013.01); *F25J 2250/30* (2013.01); *F25J 2260/02* (2013.01); *F25J 2270/02* (2013.01); *F25J 2270/80* (2013.01); *F25J 2290/12* (2013.01); *F25J 2290/32* (2013.01); *Y02C 10/12* (2013.01)

(56) References Cited

U.S. PATENT DOCUMENTS

| | | | |
|---|---|---|---|
| 2004/0251008 A1* | 12/2004 | O'Neill | F25J 3/04412 165/166 |
| 2009/0013868 A1 | 1/2009 | Darde et al. | |
| 2010/0326134 A1 | 12/2010 | Johnke et al. | |
| 2011/0296867 A1* | 12/2011 | Cuellar | F25J 3/0266 62/617 |

FOREIGN PATENT DOCUMENTS

| | | |
|---|---|---|
| WO | WO 2011 089383 | 7/2011 |
| WO | WO 2012 030223 | 3/2012 |

* cited by examiner

METHOD AND APPARATUS FOR PURIFYING A CARBON DIOXIDE-RICH MIXTURE AT A LOW TEMPERATURE

CROSS REFERENCE TO RELATED APPLICATIONS

This application is a § 371 of International PCT Application PCT/FR2013/051649, filed Jul. 10, 2013, which claims the benefit of FR1256778, filed Jul. 13, 2012, both of which are herein incorporated by reference in their entireties.

TECHNICAL FIELD OF THE INVENTION

The present invention relates to a process and to a device for purifying a mixture rich in carbon dioxide at low temperature.

BACKGROUND

A low temperature is below 0° C., preferably below −40° C.

A mixture rich in carbon dioxide contains at least 60 mol % of carbon dioxide or even at least 80 mol % of carbon dioxide.

The remainder of the mixture may contain one or more of the following components: oxygen, nitrogen, argon, nitrogen oxide (NO, $NO_2$ or $N_2O$), carbon monoxide, hydrogen, mercury.

The purification may be carried out by one or more successive partial condensation steps and/or by distillation.

US-A-2010/0326134 describes a process according to the preamble of claim 1. WO-A-2012/030223 describes a process according to the preamble of claim 1 except that it does not mention the technology used for the first heat exchanger.

In the prior art, the process used for purifying $CO_2$ in a large amount consists in cooling the $CO_2$-rich gas mixture to the temperature as close as possible to the freezing of the $CO_2$ (−56.5° C.) in order to condense the maximum amount of $CO_2$. The cold is provided in general by the vaporization of the $CO_2$ recovered and the heating of the various fluids, for example the vaporized $CO_2$, the noncondensable gases, or various recycling streams. Advanced thermal integration makes it possible to reduce the energy consumption of the process. Thus, brazed aluminum plate exchangers are particularly well suited for cooling the $CO_2$-rich gas mixture since they permit heat exchanges between numerous fluids (6 is a common number) with a small temperature difference between the hot fluids and the cold fluids (a difference of 2° C. is common practice also).

The coldest temperature of the exchange is provided by the vaporization of $CO_2$ close to the triple point. This vaporization thus has the risk of making a solid $CO_2$ phase appear if the pressure drops to the triple point value. Indeed, below the pressure of the triple point (5.185 bar a), liquid $CO_2$ cannot exist and it is then converted to a solid phase (for around 60% of the molecules) and a gas phase. The vaporization of the liquid provides the cold necessary for solidifying the rest.

This solid phase, which may appear upon a fluctuation of the pressure of the vaporized gas, for example if the compressor which recovers it sucks up more molecules than vaporized in the exchanger, may block the exchanger and damage it during heating phases. This is a limitation for the use of a brazed aluminum exchanger.

SUMMARY OF THE INVENTION

There are several ways to reduce the risk of damaging the unit:

1. Operate at higher pressure, that is to say heat the cold end, and therefore condense less $CO_2$ in the CPU. This will increase the energy cost of the $CO_2$.
2. Raise the position of the liquid supply pot above the exchanger, so as to ensure that the pressure of the liquid in the exchanger is always greater than the pressure of the liquid in the pot owing to the hydrostatic height and therefore that it cannot form a solid in the exchanger. This solution, more elegant since it avoids in almost all cases the formation of solid in the exchanger (which point 1 does not permit), all the same degrades the energy efficiency since the vaporization of $CO_2$ will be carried out at higher pressure (the hydrostatic height) and therefore higher temperature.

The invention proposed here aims to make it possible to operate as close as possible to the triple point, or even with the liquid $CO_2$ at the triple point.

According to one subject of the invention, a process is provided for purifying a mixture containing carbon dioxide at low temperature in order to produce a fluid rich in carbon dioxide wherein:

i) the mixture rich in carbon dioxide is cooled in a first brazed aluminum plate heat exchanger, consisting of corrugated sheets separated by plates, ii) the cooled mixture or at least one fluid derived from the cooled mixture is sent to a purification step comprising a distillation step and/or at least two successive steps of partial condensation, iii) the purification step produces a gas depleted in carbon dioxide which is heated in the first exchanger, iv) the purification step produces a liquid rich in carbon dioxide which is expanded then sent to a second heat exchanger where it is heated using a process fluid, the exchanger carrying out an indirect heat exchange only between the liquid rich in carbon dioxide and the process fluid, and v) the liquid rich in carbon dioxide is at least partially vaporized in the second exchanger and the vaporized gas formed is heated in the first exchanger in order to form a gas rich in carbon dioxide, that may be the final product of the process, characterized in that the process fluid which heats the liquid rich in carbon dioxide in the second exchanger consists of a gas derived from the mixture cooled in the first exchanger and in that the cooled mixture is at least partially condensed in the first exchanger and is sent to a first phase separator and the gas from the first phase separator is sent to the second exchanger where it is at least partially condensed in order to form condensed liquid.

According to other optional aspects:

- the gas rich in carbon dioxide is compressed and condensed in order to form a liquid rich in carbon dioxide which is a final product of the process;
- the liquid from the first phase separator is expanded and sent to a second phase separator;
- the condensed liquid is sent to a (the) second phase separator;
- the liquid from the second phase separator is expanded and is sent to the top of a distillation column where the distillation takes place, in order to supply the distillation column;
- the gas from the second phase separator is heated in the first exchanger;

the liquid from the first phase separator is expanded and sent to the top of a distillation column where the distillation takes place, in order to supply the distillation column;

the cooled mixture is at least partially condensed in the first exchanger and is sent to a first phase separator, the liquid from the first phase separator being expanded and sent to a second phase separator, the gas from the first phase separator is sent to the second exchanger where it is condensed in order to form condensed liquid, the condensed liquid is sent to the second phase separator and the liquid from the second phase separator is sent to the top of the distillation column in order to supply the distillation column;

the second exchanger is a shell and tube exchanger, the liquid rich in carbon dioxide being sent to be heated in the shell and the process fluid being sent to be cooled in the tubes;

a second liquid rich in carbon dioxide is produced by the purification step and sent to the first exchanger without passing through the second exchanger and preferably without having been expanded, this second liquid is vaporized in the first exchanger in order to form a gas rich in carbon dioxide;

a purge liquid from the second exchanger is vaporized in order to provide frigories to the process;

the liquid rich in carbon dioxide is sent to the second exchanger after expansion at a pressure corresponding to that of the triple point of carbon dioxide and at a temperature equal to its triple point;

the density of the liquid phase rich in carbon dioxide used in the second exchanger for cooling the gas mixture rich in carbon dioxide is between 1171 kg/m$^3$ and 1562 kg/m$^3$.

According to another subject of the invention, a device is provided for purifying a mixture containing carbon dioxide at low temperature in order to produce a fluid rich in carbon dioxide comprising a first brazed aluminum plate heat exchanger, consisting of corrugated sheets separated by plates, a second exchanger other than a brazed aluminum plate exchanger capable of permitting an indirect heat exchange between only two fluids, a purification unit comprising at least one distillation column and/or at least two phase separators connected in series, a duct for sending the mixture rich in carbon dioxide to be cooled in the first exchanger, a duct for sending the cooled mixture or at least one fluid derived from the cooled mixture to the purification unit, a duct for extracting from the purification unit a gas depleted in carbon dioxide connected to the first exchanger, a duct for extracting from the purification unit a liquid rich in carbon dioxide connected to a valve, the valve being connected to the second heat exchanger and a duct for sending a process fluid to the second exchanger in order to vaporize the liquid rich in carbon dioxide and a duct for sending the gas produced by the vaporization of the liquid rich in carbon dioxide in the second exchanger to the first exchanger in order to be heated, characterized in that it comprises means for sending a gas, derived from the mixture cooled in the first exchanger, as process fluid that heats the liquid rich in carbon dioxide in the second exchanger, a first phase separator, means for sending the cooled mixture from the first exchanger to the first phase separator and means for sending a gas from the first phase separator to the second exchanger.

The second exchanger is optionally a shell and tube exchanger.

There may be means for sending a liquid from the first phase separator and/or from a second phase separator to the distillation column.

According to other optional subjects, the device comprises:

a compressor for compressing the gas rich in carbon dioxide and a cooler for condensing the compressed gas in order to form a liquid rich in carbon dioxide which is a final product of the process;

the process fluid which heats the liquid rich in carbon dioxide in the second exchanger consists of a gas derived from the mixture cooled in the first exchanger;

a second phase separator, means for expanding the liquid from the first phase separator and for sending it to the second phase separator, means for sending the gas from the first phase separator to the second exchanger where it is condensed in order to form condensed liquid, means for sending the condensed liquid to the second phase separator and means for sending the liquid from the second phase separator to the top of the distillation column in order to supply the distillation column;

a duct for sending the gas from the second phase separator to be heated in the first exchanger;

the second exchanger is a shell and tube exchanger, means for sending the liquid rich in carbon dioxide to be heated in the shell and means for sending the process fluid to be cooled in the tubes;

means for sending a second liquid rich in carbon dioxide produced by the purification step to the first exchanger without passing through the second exchanger and preferably without having been expanded;

means for sending a purge liquid from the second exchanger to be vaporized in an exchanger in order to provide frigories to the process.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The principle according to the invention is to revert to an exchanger that enables an indirect heat exchange between only two fluids, for example a "shell and tube" exchanger where the $CO_2$ is vaporized in the shell and the flow to be partially condensed is found in the tubes. Since the boiling liquid is found in a shell, it is no longer to be feared that the appearance of a solid phase will block the passages and lead to local overpressures when some solid sublimes between two plugs of ice.

It is therefore possible to operate the pot at the triple point pressure for the boiling liquid; the solid $CO_2$ that appears periodically will melt when the pressure goes back up above the triple point or when the liquid supplying the exchanger is slightly overheated.

The impurities optionally present in the liquid $CO_2$ vaporized will be discharged from the exchanger:

either in the gas phase for the lightest impurities;
or in a liquid purge for the heaviest impurities.

This liquid purge will be discharged from the exchanger.

The invention will be described in greater detail by referring to FIGS. 1 to 4 which represent processes according to the invention.

Figure 1:
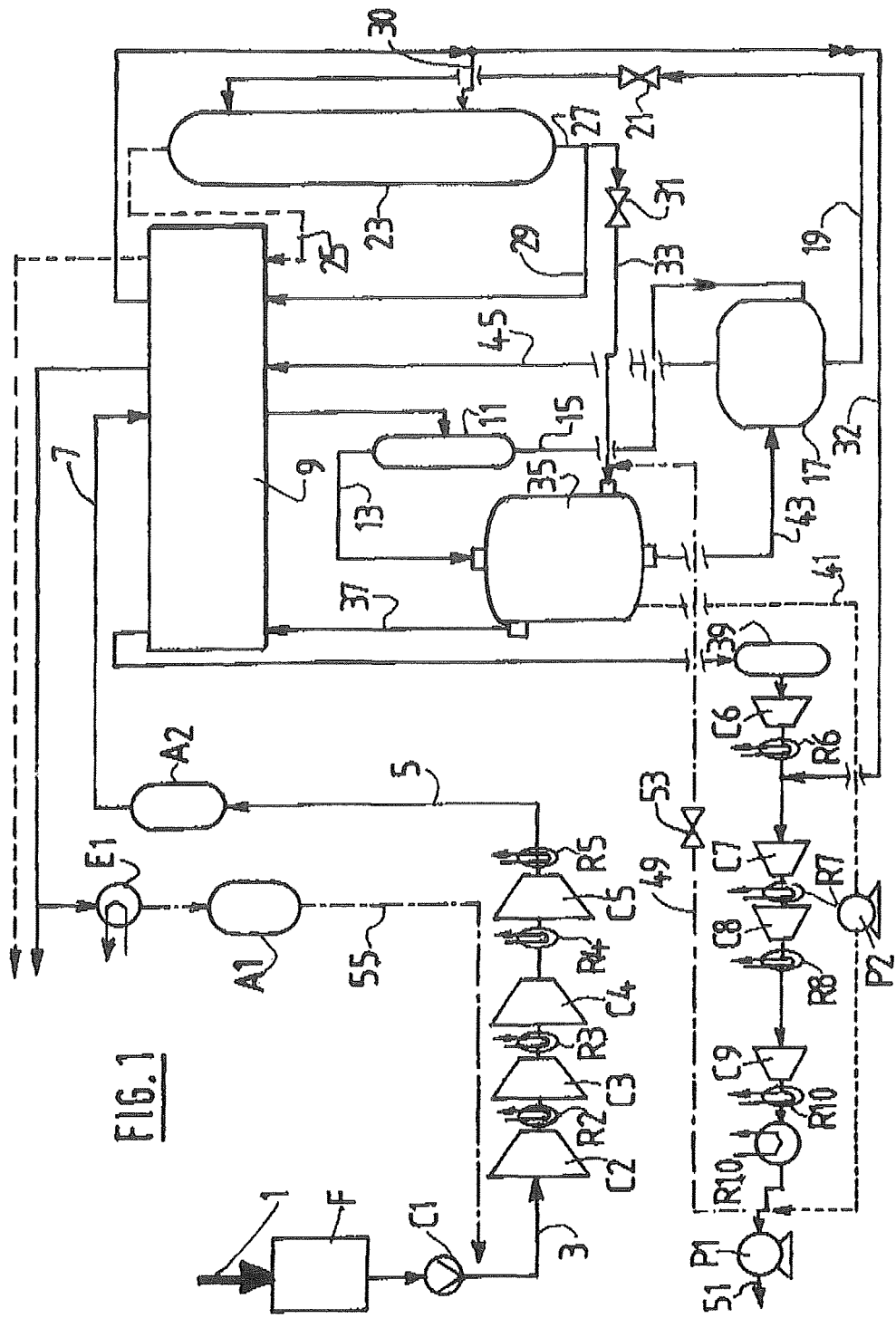
FIG. 1 provides an embodiment of the present invention.

In FIG. 1, a mixture 1 contains at least 60 mol % of carbon dioxide, or even at least 80 mol % of carbon dioxide.

The remainder of the mixture 1 may contain one or more of the following components: oxygen, nitrogen, argon, nitrogen oxide (NO, $NO_2$ or $N_2O$), carbon monoxide, hydrogen.

The mixture is filtered in a filter F in order to remove the dust, then compressed in a first compressor stage C1 in order to form a compressed flow 3. The compressed flow 3 is compressed in a second compressor stage C2, cooled in a cooler R2, compressed in a third compressor stage C3, cooled in a cooler R3, compressed in a fourth compressor stage C4, cooled in a cooler R4, compressed in a fifth compressor stage C5 and cooled in a cooler R5 in order to form a flow 5 at between 6 and 20 bar abs. This flow of the mixture 5 is purified of water in a bed of adsorbent A2 in order to form a purified flow 7. The purified flow 7 is partially condensed in a first exchanger 9, which is an aluminum exchanger consisting of a stack of corrugated layers separated by plates. The partially condensed flow is sent to a first phase separator 11. The gas formed 13 is sent to the tubes of a second exchanger 35, enabling an indirect exchange of heat between only two fluids, of shell and tube type. The figure does not illustrate the multiplicity of tubes where the gas 13 derived from the mixture is condensed. The liquid formed 43 is sent to a second phase separator 17, where the liquid 15 from the first phase separator 11 is also sent.

A gas 45 from the second phase separator 17 is heated in the first heat exchanger. The liquid 19 from the second separator 17 is expanded in a valve 21 and sent to the top of the distillation column 23.

An overhead gas 25 depleted in carbon dioxide but enriched in at least one of the impurities (oxygen, nitrogen, argon, nitrogen oxide (NO, $NO_2$ or $N_2O$), carbon monoxide, hydrogen) is heated in the first heat exchanger 9.

A bottoms liquid 27 is withdrawn from the bottom of the column and contains at least 80 mol % of carbon dioxide. The liquid 27 is divided into two; one flow 29 is vaporized in the first heat exchanger 9 without having been expanded. A portion 30 of the gas formed is sent to the bottom of the distillation column. The remainder 32 forms part of the product of the process.

The liquid 33 originating from the bottom of the column is expanded in a valve 31 up to a pressure equivalent to the triple point of the carbon dioxide that it contains. The liquid is then sent to the shell of the second exchanger 35 where it is partially vaporized. The gas 37 formed is heated in the first exchanger 9 and sent to an intermediate vessel for absorbing the pressure variations 39. From there it is compressed by a compressor stage C6 and cooled in a cooler R6 before being mixed with the vaporized liquid 32. The gas thus formed is compressed by the stages C7, C8, C9 and cooled by the coolers R7, R8, R9, R10 in order to form a condensed gas. This condensed gas is mixed with the liquid purge 41 from the second exchanger and partly pumped by a pump P1 in order to form a pressurized liquid product 51, at least 50 bar. The liquid purge 41 has previously been pumped in a pump P2. A portion 49 of the liquid is used as cycle liquid, is expanded at the triple point in the valve 53 and sent to the second exchanger 35, mixed with the flow 33.

A portion of the gas 45 is heated in an exchanger E1 and is used to regenerate the adsorbent bed A1 which is in the regeneration phase. The flow 55, having been used for the regeneration, is mixed with the flow 3 downstream of the stage C1.

It is of course possible to vaporize the liquid 33 in the second exchanger 35 by indirect heat exchange with another fluid from the process, for example a portion of the vaporized bottoms liquid.

The purge liquid 41 is pumped by the pump P2 up to the pressure where the remainder of the $CO_2$ is condensed (against air or water in the cooler R10) (around 80 bar a) in order to be mixed therewith.

One drawback is that this cold liquid represents a significant heat loss for the cold box; the advantage is that since this fluid does not pass through the product compressor, the latter is of reduced size.

Figure 2:
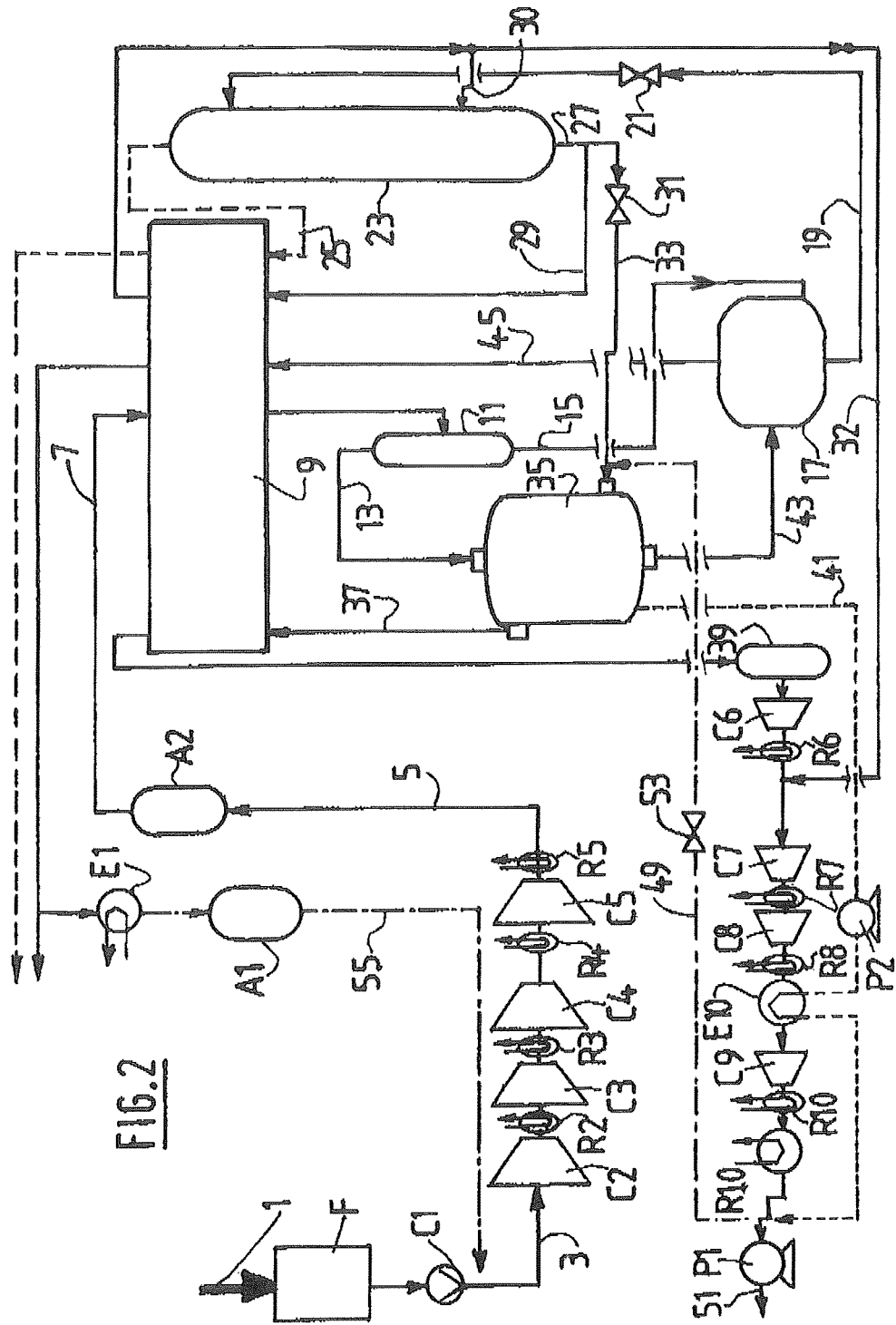
FIG. 2 provides an embodiment of the present invention.

It is possible to heat the liquid 41 thus pumped in the pump P2 before mixing it with the liquid $CO_2$ at ambient temperature in order to recover the frigories of the sensible heat of the purge, for example in order to reduce the compression energy of the $CO_2$ produced by the exchanger 9 in FIG. 2.

Thus, the liquid pumped is used as refrigerant in a cooler E10 between the cooler R8 and the compressor stage C9.

Another variant will produce iced water in the exchanger E10 or any other reuse of this cold that can be envisaged.

Figure 3:
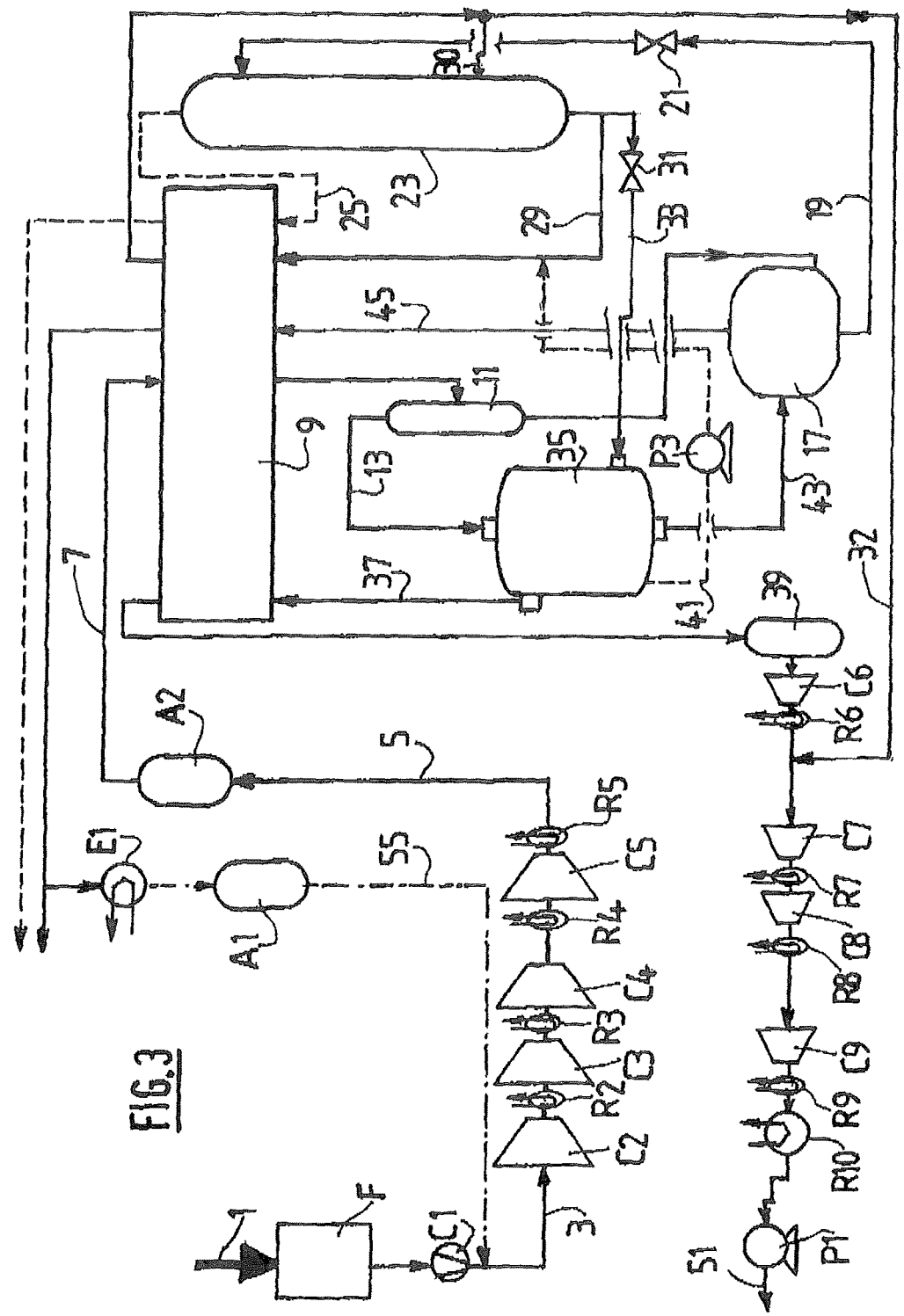
FIG. 3 provides an embodiment of the present invention.

In FIG. 3, the purge liquid 41 is pressurized in a pump P3 up to a higher pressure at which the $CO_2$, produced by the partial condensation(s) and/or the distillation, is vaporized. The purge 41 is then mixed with this liquid $CO_2$ 29 and it is vaporized in the higher pressure flow. Since this vaporization is carried out in the main brazed aluminum exchanger 9, the purge may be vaporized completely and there is then no longer any loss of cold and it is possible to cancel the $CO_2$ 49 recycled in order to provide frigories from the preceding figures.

Figure 4:
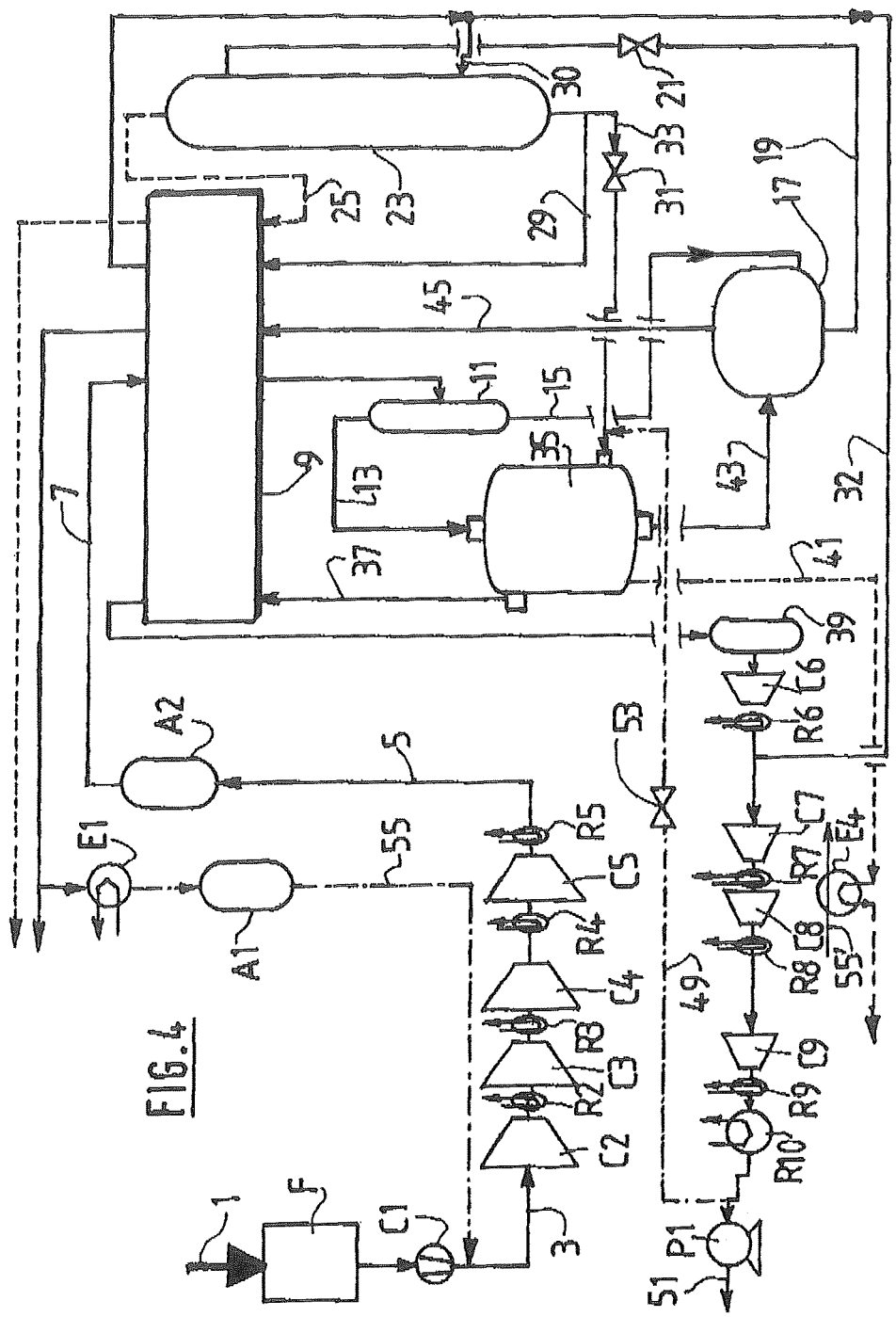
FIG. 4 provides an embodiment of the present invention.

In FIG. 4, the purge flow 41 is vaporized outside of the cold box in an exchanger E4 in order to produce iced water 55. Otherwise, the flow 41 may be used to precool the cold box supply gas or to cool the $CO_2$ produced or for any other reuse of the cold contained. The gas thus obtained by vaporizing the liquid 41 may then be vented if it contains impurities that it is not desired to reuse by some other means, the gas could be treated in order to reduce the content of impurities (washing, adsorption, catalytic bed, etc.). Otherwise the gas may be recycled to the boiler or to the desulfurization unit where the mixture 1 comes from in order to reduce the content of NOx or other content of combustible impurity (hydrocarbons, alcohol, etc.) or else used for any other application (recovery of the NOx contained, hydrocarbons, alcohols, etc.).

The pump P2, P3 will have to be able to face solid phases (solid $CO_2$, crystallization of $N_2O_4$ or of other impurities) since all the heavy elements should be concentrated therein.

Finally, it should be noted that the brazed aluminum exchanger 9, although only cooling the feed gas down to −40° C. approximately, concentrates all the fluids that may make it possible to recover frigories in order to carry out this first cooling. Thus, the use of a solely two-fluid exchanger 35 for the cold box does not degrade the thermal performance of the assembly too much. It will be advisable to suitably arrange the passages in the exchanger in order to prevent excessively large heat differences, especially with the coldest fluids, for example $CO_2$ at low pressure vaporized in the "shell and tube" exchanger. The principle is to position the cold gaseous fluids at the ends, solely in contact (indirectly of course) with the "HP" CO$_2$ flow that is vaporized. The latter will be the only fluid in (indirect) contact with the hot fluid that is partially condensed.

This point is even more important for the application where it is necessary to avoid accumulating mercury in this exchanger. Thus, it is necessary to prevent the hot fluid from being in contact with fluids colder than the triple point of mercury, i.e. −38° C. Specifically, it would then be possible to locally drop below −38° C. and deposit mercury in solid form in the exchanger.

In all the figures, the column 23 may be replaced by a series of phase separators which separate the liquid 19 in order to form a gas 25 depleted in carbon dioxide and a liquid 33 enriched in carbon dioxide.

The column 23, the exchanger 9, the phase separators 11, 17 and the exchanger 35 are contained inside a thermal chamber since they operate at low temperature.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A method of purifying a carbon dioxide-rich feed gas at a low temperature in order to produce a carbon dioxide-rich fluid, wherein the low temperature is below 0° C., the method comprising the steps of:

i) cooling and partially condensing the carbon dioxide-rich feed gas in a first heat exchanger to form a partially condensed carbon dioxide-rich fluid, wherein the first heat exchanger is a brazed aluminum plate heat exchanger comprising corrugated layers separated by plates;

ii) introducing the partially condensed carbon dioxide-rich fluid to a first phase separator to produce a first gas at a top of the first phase separator and a first liquid at a bottom of the first phase separator;

iii) introducing the first gas to a second heat exchanger and condensing said first gas within the second heat exchanger against an expanded carbon dioxide-rich liquid thereby forming a second bottom fluid at a bottom of the second heat exchanger and a second gas at a top of the second heat exchanger, wherein the second heat exchanger is a shell and tube heat exchanger;

iv) introducing the second bottom fluid and the first liquid from the first phase separator to a second phase separator to produce a third gas a top of the second phase separator and a third liquid at a bottom of the second phase separator;

v) introducing the third liquid from the second phase separator to a distillation column to produce a head gas at a top of the distillation column and a bottoms liquid at a bottom of the distillation column, wherein the head gas is carbon dioxide-lean as compared to the third liquid, wherein the bottoms liquid is carbon dioxide-rich as compared to the third liquid;

vi) expanding the bottoms liquid to form the expanded carbon dioxide-rich liquid, wherein the expanded carbon dioxide-rich liquid is at a pressure and a temperature corresponding to that of the triple point of carbon dioxide;

vii) vaporizing the expanded carbon dioxide-rich liquid in the second heat exchanger to form the second gas at the top of the second heat exchanger, wherein the second gas is carbon dioxide-rich; and viii) warming the second gas in the first heat exchanger to form a carbon dioxide-rich product stream, wherein the first gas from the first phase separator is condensed within the tubes of the second heat exchanger, and the expanded carbon dioxide-rich liquid is vaporized in the shell of the second heat exchanger, wherein the first gas from the first phase separator and the expanded carbon dioxide-rich liquid are the only two fluids exchanging heat within the second heat exchanger.

2. The process as claimed in claim 1, wherein the carbon dioxide-rich product stream is compressed and condensed in order to form a liquid rich in carbon dioxide.

3. The process as claimed in claim 1, wherein the third gas from the second phase separator is heated in the first exchanger.

4. The process as claimed in claim 1, wherein a purge liquid from the second heat exchanger is vaporized in order to provide frigories to the process.

5. The process as claimed in claim 1, wherein a density of the expanded carbon dioxide-rich liquid used in the second heat exchanger for cooling the first gas is between 1171 kg/m$^3$ and 1562 kg/m$^3$.

* * * * *